(No Model.)
A. H. VAN RIPER.
FIRE EXTINGUISHER.
No. 605,033. Patented May 31, 1898.
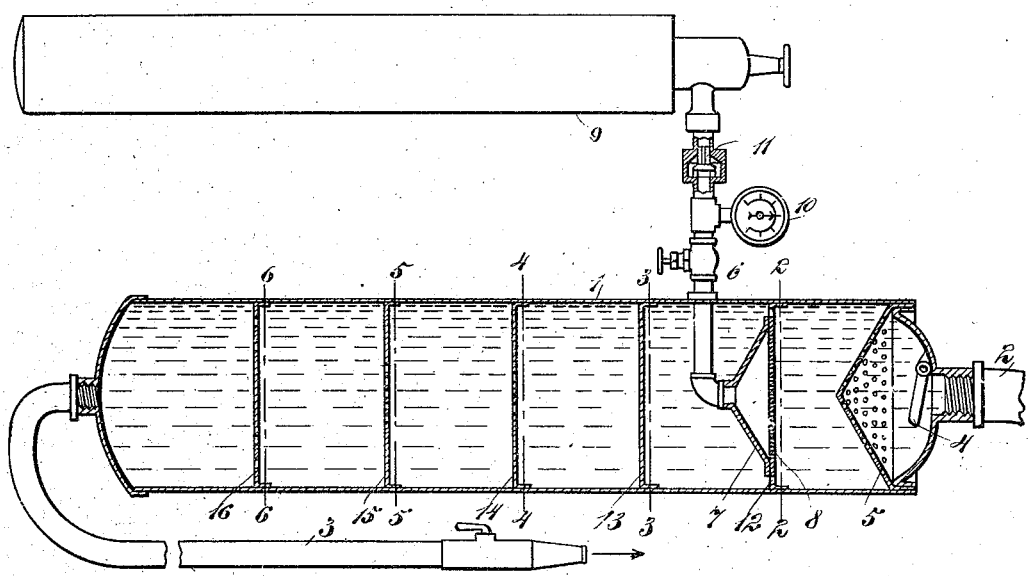
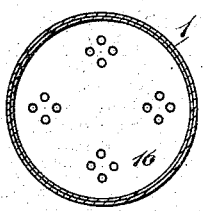 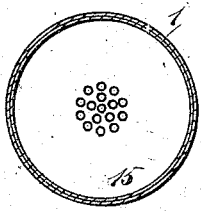 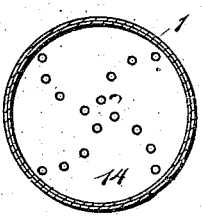 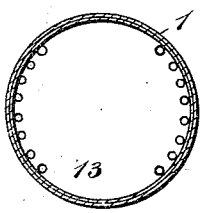 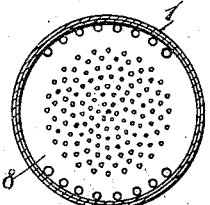
WITNESSES
Donn Twitchell
C. R. Ferguson
INVENTOR
A. H. Van Riper.
BY
ATTORNEYS.

UNITED STATES PATENT OFFICE.

ABRAM H. VAN RIPER, OF NUTLEY, NEW JERSEY.

FIRE-EXTINGUISHER.

SPECIFICATION forming part of Letters Patent No. 605,033, dated May 31, 1898.

Application filed March 25, 1897. Serial No. 629,239. (No model.)

*To all whom it may concern:*

Be it known that I, ABRAM H. VAN RIPER, of Nutley, in the county of Essex and State of New Jersey, have invented a new and Improved Fire-Extinguisher, of which the following is a full, clear, and exact description.

This invention relates to fire-extinguishers of the class in which a chemical is used in connection with water.

Chemical fire-extinguishers have heretofore been made in which the chemical is to be mixed with water contained in a tank and then ejected by the pressure created; but in such class of extinguishers the supply is limited to the capacity of the tank.

The object of my invention is to provide a simple means whereby a chemical may be mixed with a stream of running water, thus increasing the capacity of the apparatus.

I will describe a fire-extinguisher embodying my invention and then point out the novel features in the appended claims.

Reference is to be had to the accompanying drawings, forming a part of this specification, in which similar characters of reference indicate corresponding parts in all the views.

Figure 1 is a partial section and partial elevation of an apparatus embodying my invention. Fig. 2 is a section on the line 2 2 of Fig. 1. Fig. 3 is a section on the line 3 3 of Fig. 1. Fig. 4 is a section on the line 4 4 of Fig. 1. Fig. 5 is a section on the line 5 5 of Fig. 1, and Fig. 6 is a section on the line 6 6 of Fig. 1.

Referring to my improvement shown in Fig. 1, 1 designates a mixing-cylinder having a feed-water hose 2 communicating with one end and a discharge-hose 3 leading from the other end. At the inner end of the inlet-hose 2, or the nipple to which said hose is connected, is a flap-valve 4, and forward of this flap-valve is a conical disk 5, provided with a number of perforations for the passage of water.

Leading into the cylinder 1 is a chemical-discharge pipe 6. This chemical-discharge pipe within the cylinder terminates in a funnel-shaped nozzle 7, to which a perforated diaphragm 8 is attached. The chemical-discharge pipe 6 is here shown as leading from a cylinder 9, designed to contain the chemical under pressure. I find carbonic-acid gas to be a suitable material to mingle with the water. The pipe 6 is provided with a pressure-gage 10 and also with a regulating-valve 11, designed to be closed by gas-pressure should the pressure of the gas or chemical in the cylinder 9 be increased to a point above the pressure of water flowing into the mixer 1, thus temporarily closing off the flow of gas from the cylinder 9.

The diaphragm 8 has a series of openings 12 arranged around its edge, and forward of this diaphragm is a series of partitions 13, 14, 15, and 16. These several partitions are provided with perforations, the location of the perforations of one partition differing from those of another. The object of so placing the perforations is to cause an agitation and thorough mixture of the water and gas or chemical passing through the cylinder 1. The combined area of the several perforations through the partitions and diaphragm will be substantially equal to the area of the inlet, and therefore the passage of the liquid will not be retarded. The partition 13 has two series of perforations arranged along its edge. The partition 14 has its perforations arranged radially from its center. The partition 15 has a series of perforations at its center, and the partition 16 has its perforations arranged in fours near its edge.

In the operation of my improvement the water from a hydrant or from any other source under pressure will enter through the pipe 2 and the gas or chemical from the pipe 6 will be forced into the water, and as the mixed chemical and water passes through the perforations of the several partitions the same will be thoroughly mixed and will discharge in this condition through the pipe 3.

It will be seen that the variously-perforated partitions form an agitator to thoroughly mix the flowing water and the chemical. When the valve of the outlet 3 is closed, the pressure of gas or chemical against the water in the cylinder 1 will close the flap-valve 4, thus preventing the escape and loss of gas or chemical.

In my improvement it is to be understood that the mixing of the water and gas is automatic—that is, the running water and inflowing gas will be, by the agitation employed, thoroughly mixed.

It is further to be understood that I do not limit my invention to fire-extinguishing purposes, as it is obvious that the device may be employed in mixing water and gas in soda-fountains or similar devices.

Having thus described my invention, I claim as new and desire to secure by Letters Patent—

1. A fire-extinguisher, comprising a mixing-cylinder, a water-inlet therefor, a perforated conical disk forward of the inlet, an outlet-pipe, a cylinder for containing gas, a pipe leading from said gas-containing cylinder into the mixing-cylinder and having a perforated-disk outlet discharging in the direction of the inlet of the first-named cylinder, and means for mixing the gas and water in the first-named cylinder, substantially as specified.

2. A fire-extinguishing apparatus, comprising a mixing-cylinder, a water-inlet therefor, a water-outlet therefor, a cylinder for containing gas under pressure, a pipe leading from the gas-cylinder to the interior of the mixing-cylinder and having a funnel-shaped nozzle, a perforated diaphragm secured to the nozzle, and a series of perforated partitions in the mixing-cylinder, the perforations through said partitions being variously placed, the perforations of one partition relatively to those of another, substantially as specified.

ABRAM H. VAN RIPER.

Witnesses:
A. A. HOPKINS,
C. R. FERGUSON.